Figure 1:
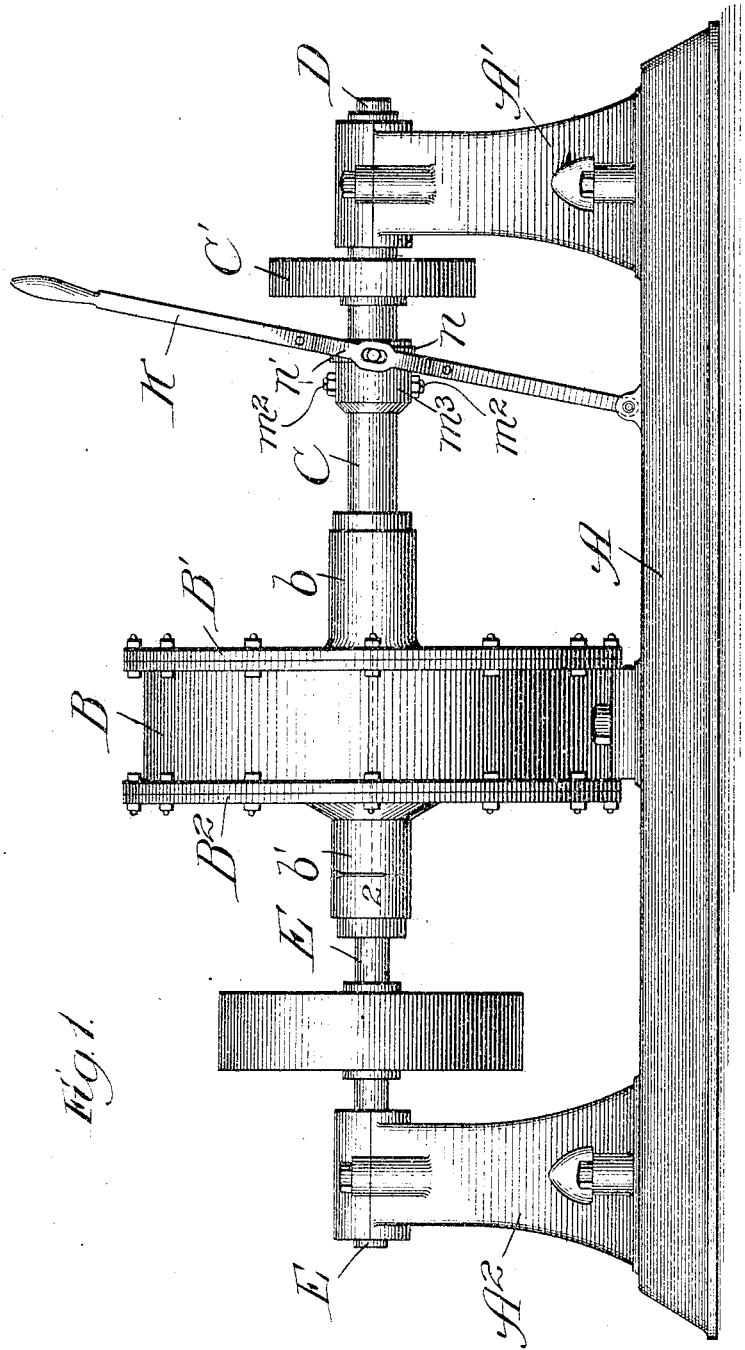

No. 787,830. PATENTED APR. 18, 1905.
W. C. CONANT.
VARIABLE SPEED GEARING.
APPLICATION FILED OCT. 18, 1904.

7 SHEETS—SHEET 3.

Witnesses:
Chas. E. Gaylord,
John Enders.

Inventor:
William C. Conant.
By Dyrenforth, Dyrenforth & Lee
Attys.

No. 787,830. PATENTED APR. 18, 1905.
W. C. CONANT.
VARIABLE SPEED GEARING.
APPLICATION FILED OCT. 12, 1904.

7 SHEETS—SHEET 5.

Witnesses:
Chas. E. Gaylord,
John Enders.

Inventor:
William C. Conant,
By Dyrenforth, Dyrenforth & Lee,
Attys.

No. 787,830. PATENTED APR. 18, 1905.
W. C. CONANT.
VARIABLE SPEED GEARING.
APPLICATION FILED OCT. 18, 1904.
7 SHEETS—SHEET 6.
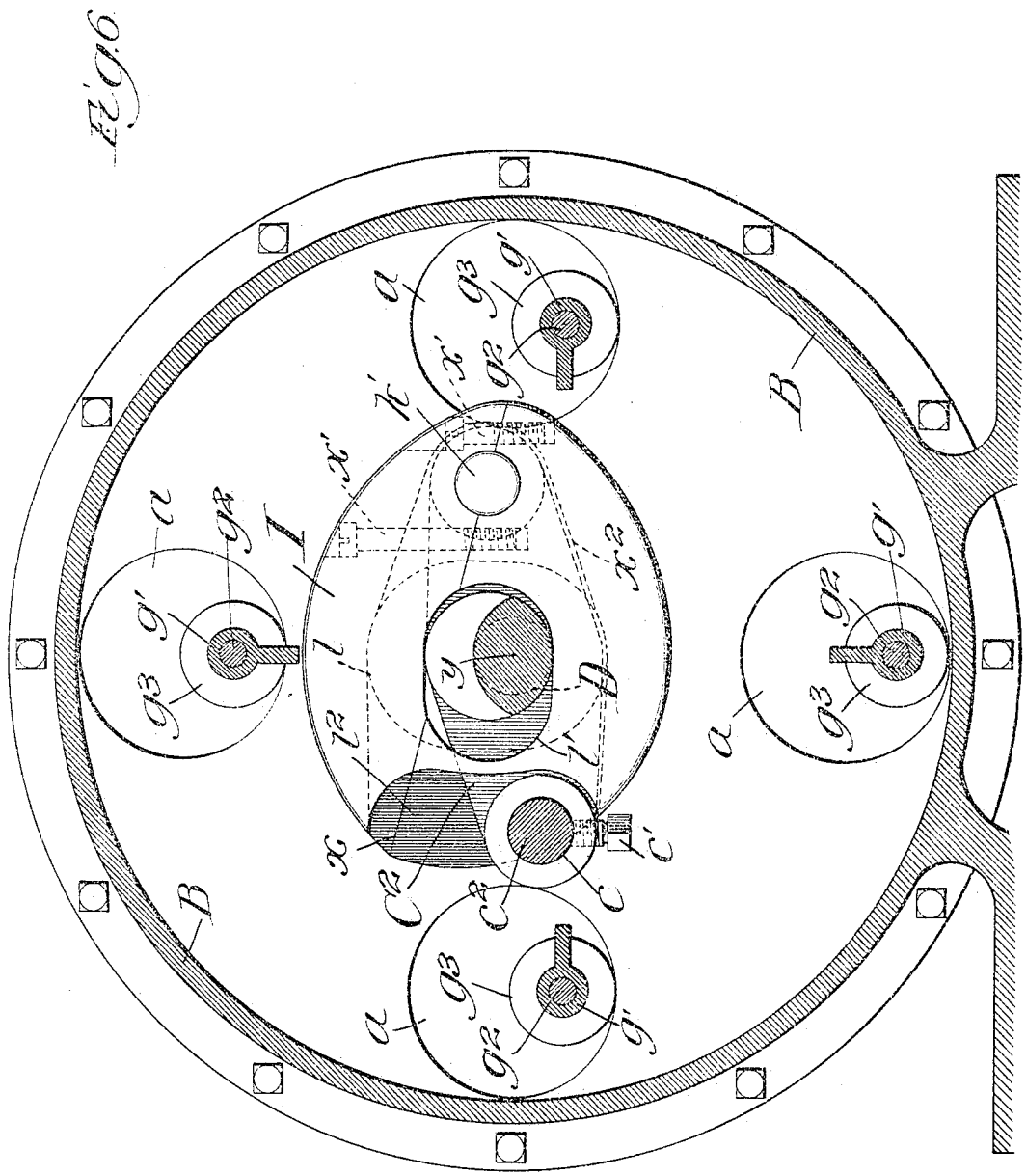

No. 787,830. PATENTED APR. 18, 1905.
W. C. CONANT.
VARIABLE SPEED GEARING.
APPLICATION FILED OCT. 18, 1904.
7 SHEETS—SHEET 7.
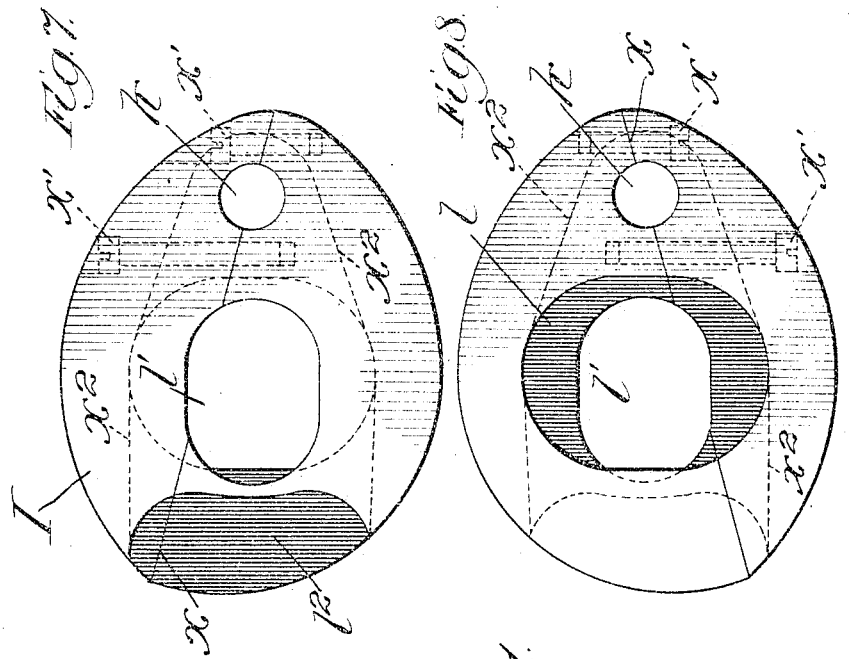
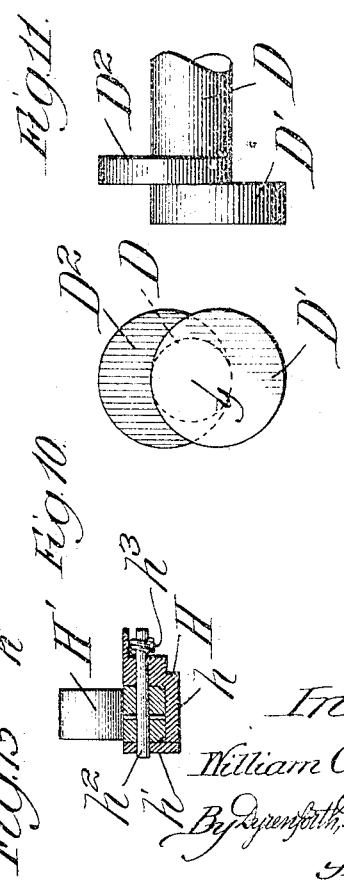
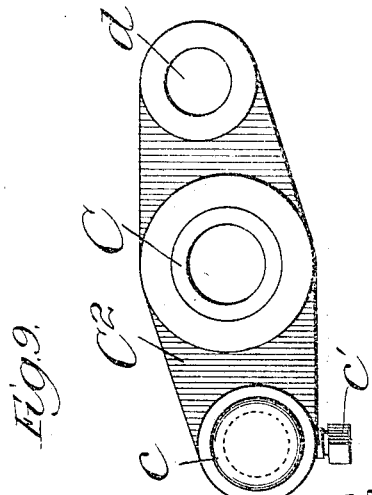
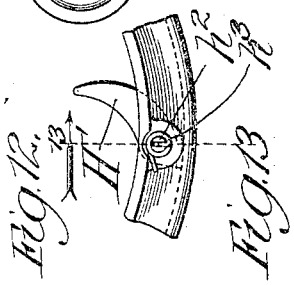
Witnesses:
Inventor.
William C. Conant,
By Dyrenforth, Dyrenforth & Lee,
Attys.

No. 787,830.

Patented April 18, 1905.

UNITED STATES PATENT OFFICE.

WILLIAM C. CONANT, OF ATLANTA, GEORGIA.

VARIABLE-SPEED GEARING.

SPECIFICATION forming part of Letters Patent No. 787,830, dated April 18, 1905.

Application filed October 18, 1904. Serial No. 228,914.

*To all whom it may concern:*

Be it known that I, WILLIAM C. CONANT, a citizen of the United States, residing at Atlanta, in the county of Fulton and State of Georgia, have invented a new and useful Improvement in Variable-Speed Gearing, of which the following is a specification.

My invention relates to improvements in gearing adapted to be interposed between rotary driving and driven shafts or bodies and capable of adjustment to render variable at will the speed and power transmitted through it from one to the other.

My object is to provide an improved construction of gradually-changeable and smoothly-acting variable-speed and power-transmission gearing which will be particularly compact and durable and insure positive driving engagement, free from danger of slip between its members.

In a separate concurrent application for Letters Patent filed by me May 9, 1904, Serial No. 207,083, I have shown and described a construction of power-transmitter wherein the variable-speed gearing interposed between driving and driven bodies employs toothed intermeshing engaging members, one of which is conoidal and longer than the other, with means for producing relative gyratory motion between the said members to maintain them in engagement and means for adjusting the members longitudinally with relation to each other to gradually change the relative diameters of their engaging surfaces.

In carrying out my present invention I dispense with the necessity of a conoidal member, which was a feature of my former construction, thereby rendering the mechanism more compact, and I substitute transversely-movable for longitudinally-movable adjusting means between the said members to vary the speed and power transmitted through the mechanism.

My invention may be applied in numerous ways and is susceptible of wide variations of construction, and in the accompanying drawings I have limited the illustrations to one of numerous forms which my improvement may take without departing from the spirit of the invention. In this construction or embodiment a drive-shaft receiving power from any source carries coincidently-adjustable cams, one of which regulates the throw or sweep of a non-rotary gyratory member provided with inwardly-extending yielding teeth or pawls and the other cam regulates or positions a counterbalance for the said gyratory mechanism on the drive-shaft. In line with the drive-shaft is a driven shaft carrying a ratchet-wheel rotating concentrically with the drive-shaft within the annular gyratory member. The regulating-cam mentioned for the gyratory member determines by its adjustment the eccentricity of said member, one or more of the yielding teeth of which are always in engagement with the ratchet-wheel. What may be called the "pitch-circle" of the gyratory member is determined by its eccentricity. In other words, when the said member is in a position nearly concentric with the ratchet-wheel the driving pitch-circle of the gyratory member will be but little greater than the diameter of the ratchet-wheel and turn the latter at the slowest speed. As the gyratory member is shifted in the direction away from its concentric position the diameter of the pitch-circle thereof due to radial pressure of the ratchet-wheel against the yielding teeth increases proportionately to the relative eccentricity of the members, and with the said increase the speed of rotation of the driven member is increased.

Figure 2:
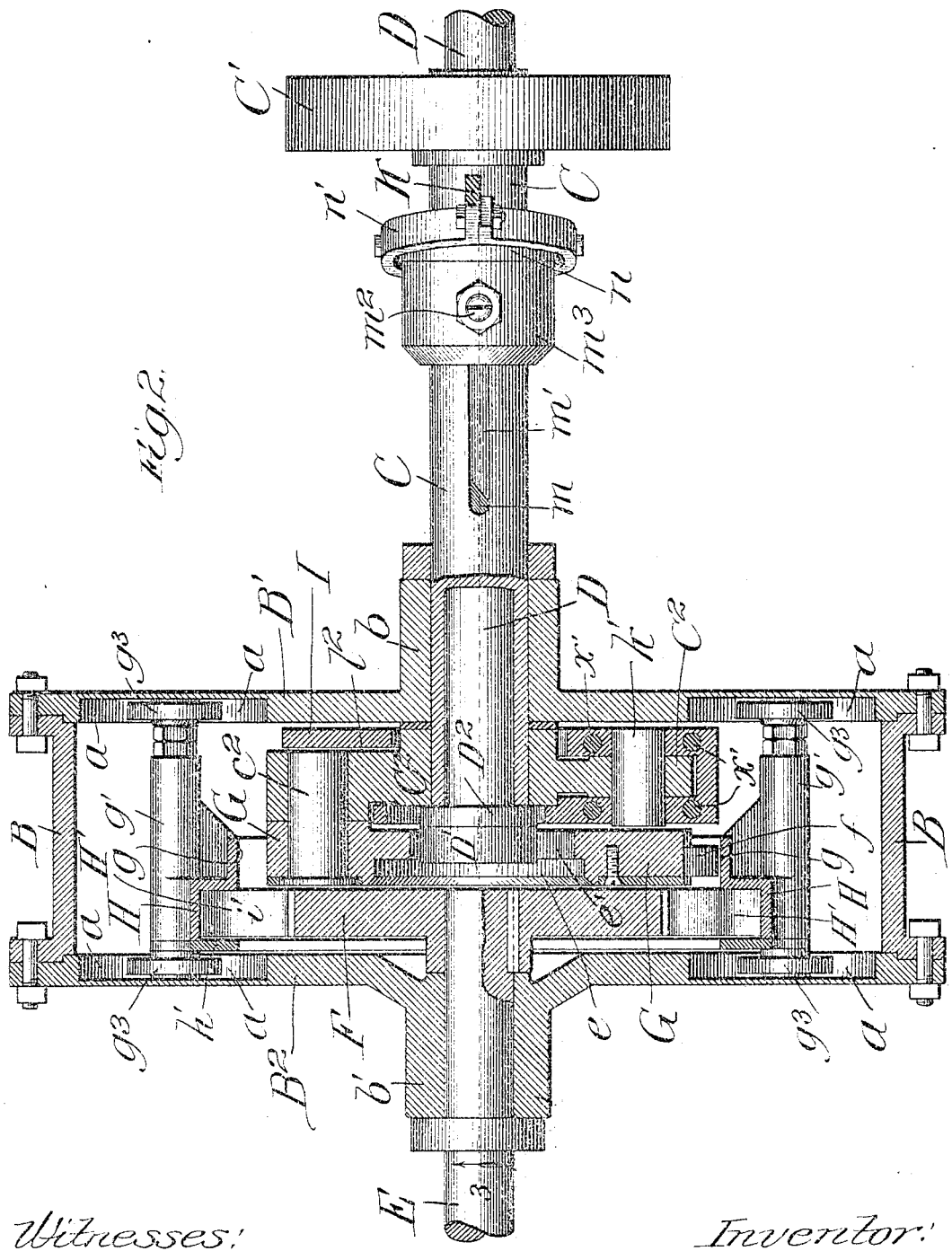
Figure 3:
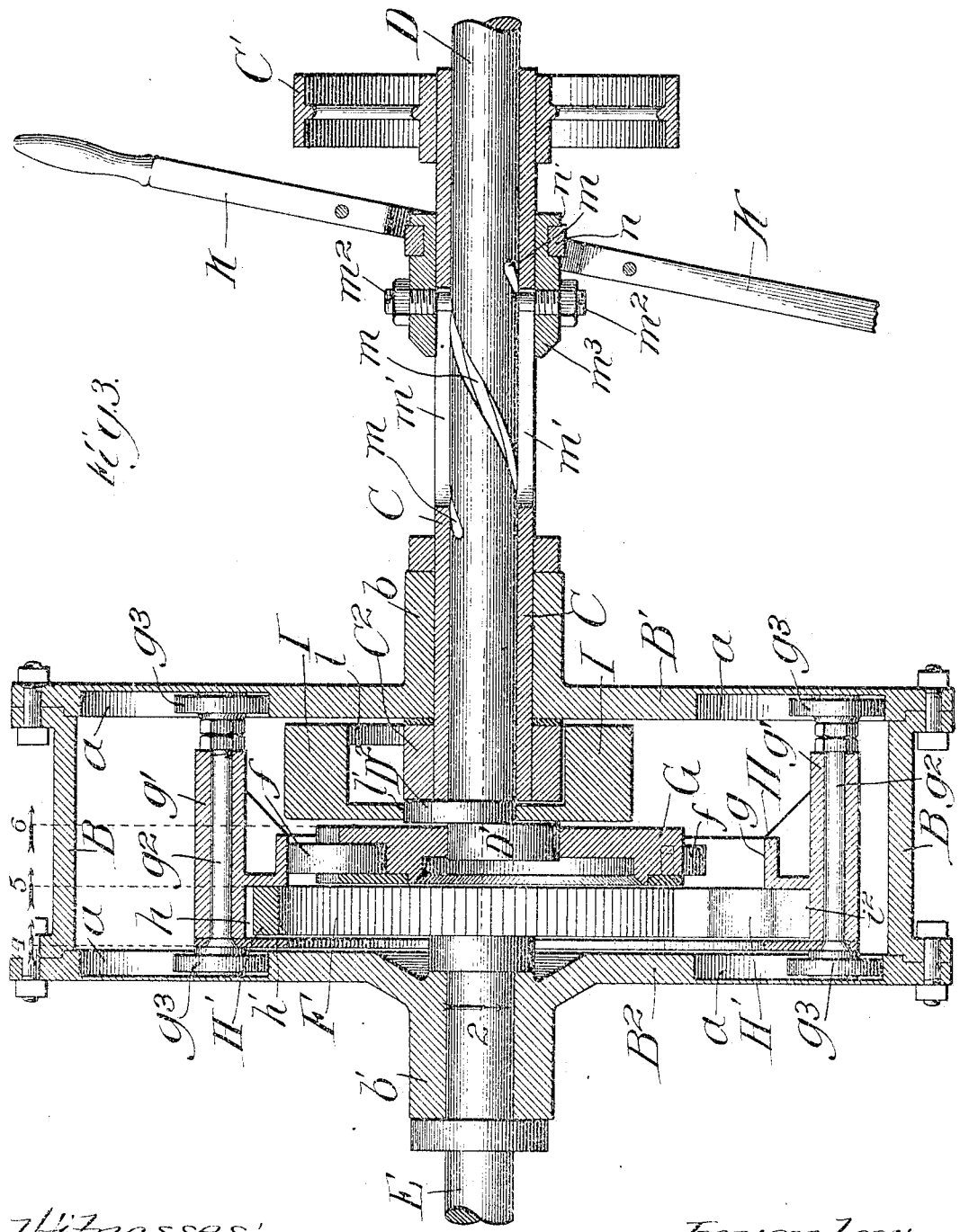
Figure 4:
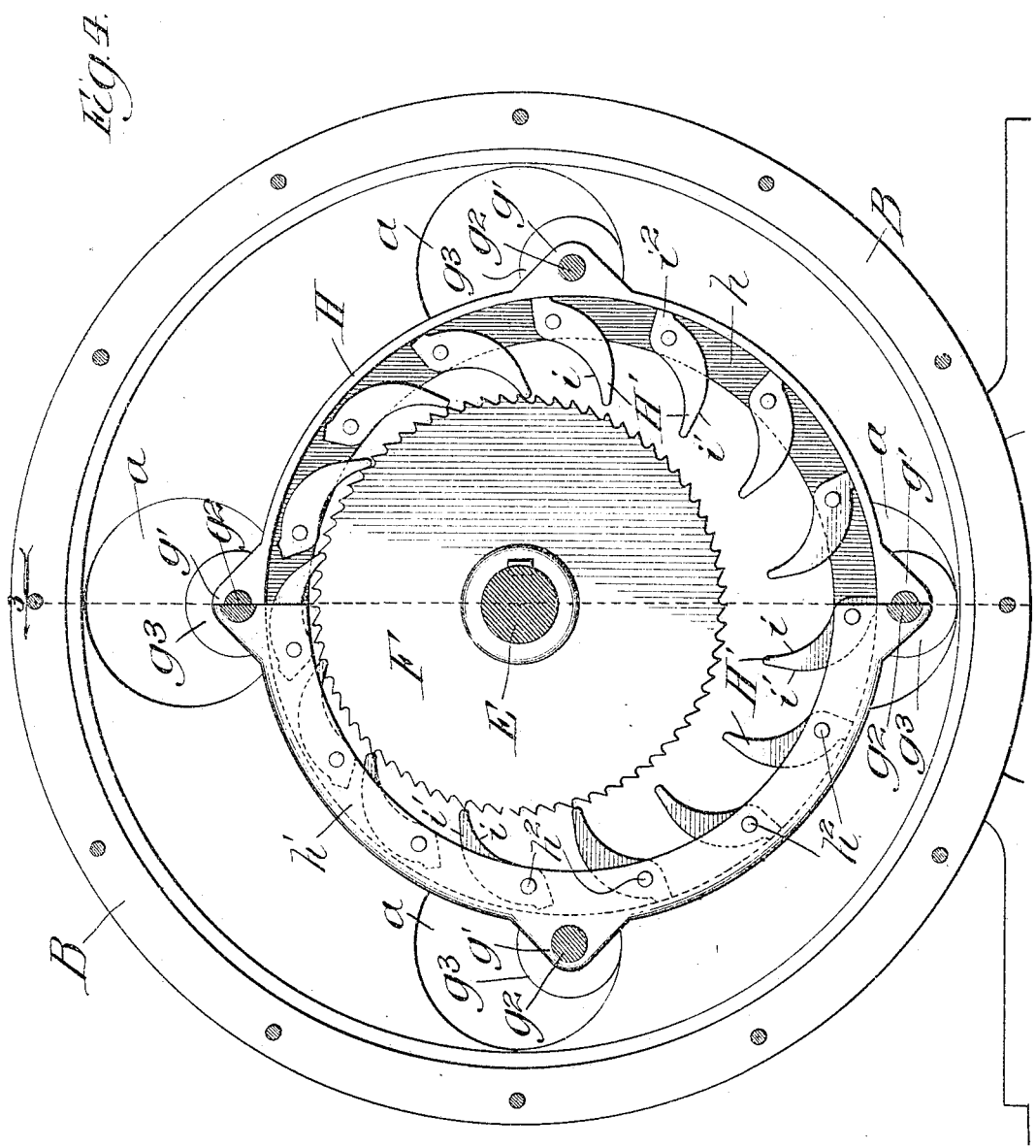
Figure 5:
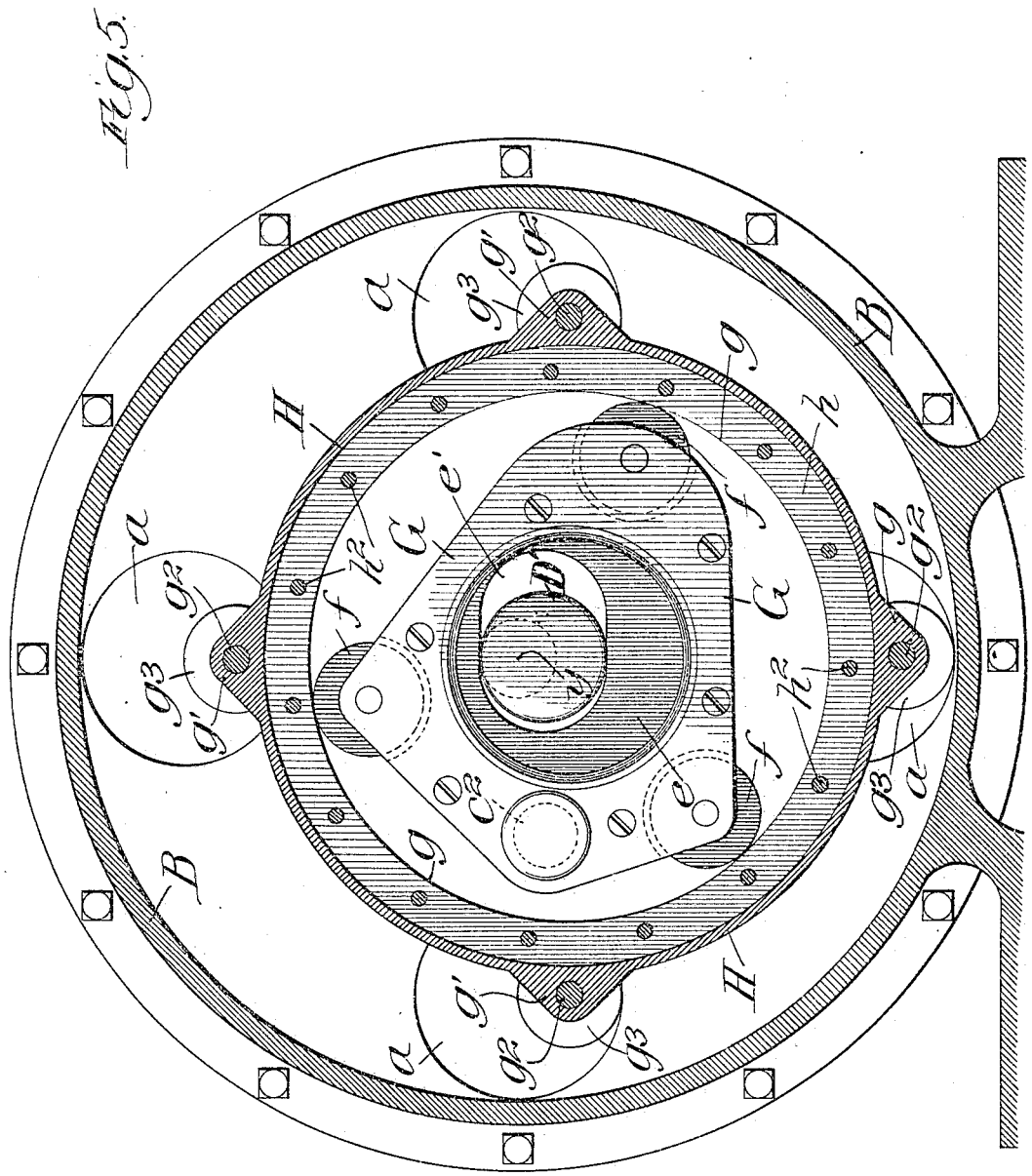

Referring to the drawings, Figure 1 is a side elevation of the variable-speed gearing; Fig. 2, an enlarged broken plan section taken on line 2 in Figs. 1 and 3; Fig. 3, a broken section taken on line 3 in Figs. 2 and 4; Fig. 4, a section taken on line 4 in Fig. 3, showing the casing, drive-shaft, ratchet-wheel, and toothed gyratory member, one half the section showing a retaining-ring upon the gyratory member, the other half of which is removed for purposes of illustration; Fig. 5, a section on the line 5 in Fig. 3, illustrating more especially operating and adjusting means for the gyratory member; Fig. 6, a section on line 6 in Fig. 3, illustrating a double crank on the drive-shaft and the adjustable counterbalance for the gyratory member; Figs. 7 and 8, detailed illustrations of opposite sides of the counterbalance; Fig. 9, a detailed view of the double crank carried by the drive-shaft; Fig. 10, an end view of the drive-shaft, showing the adjusting-cranks for the gyratory member and its counterbalance; Fig. 11, a broken side elevation of the end portion of the drive-shaft; Fig. 12, a fragmentary view of the gyratory member, showing one of its yielding teeth or pawls; and Fig. 13 a section taken on line 13 in Fig. 12

The sections are viewed as indicated by the arrows of the figures at which they are taken and show in each case only certain parts to avoid confusion.

Mounted on a base A are the pillow-blocks A' A² and a stationary drum or casing B, provided with the ends or heads B' B². In the inner faces of the heads are coincident circular recesses $a$, which at each side of the chamber or casing may be four in number and equidistant apart, as shown.

C is a sleeve or quill passing through and journaled in the hub $b$ of the head B'. The quill carries the drive-pulley C'. Journaled at one end in the block A' and passing entirely through the quill C is a shaft D. Fixed upon the inner end of the quill C in the casing is a double crank C², (shown most plainly in Fig. 9,) provided in opposite ends with the openings $c$ $d$. Formed upon the inner end portion of the shaft D are the oppositely-projecting cams D' D², as shown most plainly in Figs. 10 and 11.

E is the driven shaft, journaled at one end in the pillow-block A² and passing through and journaled in the hub $b'$ of the head B². Just within the chamber or casing the shaft E carries keyed thereto a ratchet wheel or member F. Fastened in the opening $c$ of the crank C² by means of a set-screw $c'$ is a short stud or pin $c^2$, on which is pivotally mounted a cam-block G, which may have the outline indicated in Fig. 5 and be formed in cross-section as indicated in Figs. 2 and 3. In one face the cam-block is provided with a central shallow recess $e$, in the base of which is an elongated cam-slot $e'$, fitting over the cam D', as shown in Fig. 5. The cam-block has journaled therein three rollers $f$, equidistant apart and extending at their peripheries beyond the edges of the cam-block. The rollers $f$ fit against the inner peripheral surface $g$ of a ring or gyratory member H, formed upon the outer edge portion of which are four parallel bosses or sleeves $g'$, through which extend shafts $g^2$, carrying rollers $g^3$ at opposite ends, as shown most plainly in Fig. 3. These rollers move in the recesses $a$ in the heads B' B². The ring or member H is provided adjacent to its surface $g$ with an inner annular socket $h$, the outer side wall of which is formed by a removable ring-plate $h'$. Pivotally mounted in the socket $h$ is an annular series of radially-yielding teeth H', formed, as shown most plainly in Fig. 4, with concave edges $i$, convex edges $i'$, and shoulders or stops $i^2$, bearing against the base of the socket when the teeth project to the fullest extent in the inward direction. The teeth are fastened upon pins $h^2$ passing through and journaled in the side walls of the socket, and on one end of each pin is a spring $h^3$, which may be coiled, as indicated in Figs. 12 and 13, operating to hold the teeth normally in extended position. Pressure in the radial direction outwardly against the teeth causes them to yield by turning more or less into the socket $h$ against the resistance of their springs $h^3$.

I is a hollow counterweight fitting over the double crank C². It is formed in two parts, separated on the line $x$, Figs. 7 and 8, the two parts being fastened together by screws $x'$, as indicated. It is open at one end, the outline of its inner surface being indicated by the dotted line $x^2$. In one end portion of the counterweight is an opening $k$, at which it is pivotally secured to the crank C² by a pin $k'$ passing through the opening $d$ of the crank. In one side of the counterweight is an oblong opening $l$, and in the opposite side thereof is an elongated opening $l'$, fitting over the cam D² on the drive-shaft. The object of the opening $l$ is to clear the hub portion of the crank, and in the end portion of the counterweight at the same side as the cam-opening $l'$ is a recess or opening $l^2$ to clear the boss about the opening $c$ of the crank.

As before stated, the double crank C² is fastened to the quill C, and the cams D' D² are an integral part of the shaft D. The variations of speed transmitted through the gearing are brought about by turning the cams to different positions with relation to the crank to adjust the gyratory member and its counterweight in opposite directions with relation to the center of rotation of the crank. In the shaft D are spiral grooves $m$ $m$, and in the quill are the longitudinally-extending slots $m'$, through which pins or keys $m^2$ pass with their ends in the grooves $m$ to key the quill and shaft adjustably together. The keys or pins $m^2$ are mounted in a rotary sliding collar $m^3$, extending around the quill, and in an annular peripheral groove of said collar is a loose non-rotary ring $n$, pivotally connected at opposite sides to the surrounding ring portion $n'$ of an operating-lever K. Movement of the lever K causes the collar $m^3$, which rotates with the quill and shaft, to slide and turn the shaft D in the quill to change its relative adjustment and that of the cams D' D².

The figures show the gyratory member H and its counterweight I in the positions of greatest eccentricity with relation to the center of rotation $y$ of the drive-shaft, which center of rotation corresponds at all times with the center of rotation of the driven shaft and member F. In the rotation of the quill C and cam-shaft D the double crank C² is rotated and rotates the cam-block G, causing it, on account of the engagement of its rollers ƒ with the surface g of the member H, to give gyratory motion to the latter. When the member H is in the position of greatest eccentricity, as shown, all the rollers g³ may contact at all times with the annular surfaces of the recesses a, which engagement causes the gyratory member to be held against axial movement. When in the position of greatest eccentricity, the pitch-circle of the teeth of the member H would be close to the inner periphery of its socket or ring portion. The radius of the pitch-circle of the driving gyratory member is determined by the distance of its yielding teeth from the center of said member when in their retracted driving engagement with the member F. The teeth H' are retracted by pressure of the more rapidly rotating toothed periphery of the member F as they move toward the constantly-changing point of driving engagement, and the greater the eccentricity of the member H the greater its pitch-circle, due to retraction of its teeth, and consequently the greater the relative speed transmitted to the member F. As before stated, the counterweight I is also shown in the position of greatest eccentricity to balance the gyratory member and the cam-block G in their position of greatest eccentricity. Relative turning of the shaft D within the quill C produces gradual turning of the cams and consequent positioning of the cam-block G and counterweight I to bring their centers of rotation nearer to the center of rotation y. The diminishing of the eccentricity of the gyratory member and consequent reduction of speed transmission is brought about gradually by movement of the lever K. When the member H is moved to a position concentric with the center of rotation y, the block G will simply rotate in said member without gyrating it, and no rotation will be given to the member F. Naturally as the gyratory member is moved more and more toward a position concentric with the point y its circular paths of gyration in the recesses a will diminish. However, one or more pairs of rollers g³ will always be in contact with the circular walls of a pair of the recesses a to hold the gyratory member against material axial movement.

From the foregoing it will be understood that by means of the lever K smooth and rapid changes of speed transmission may be effected between the driving and driven shafts. The changes in the pitch-circle of one member brought about by transverse adjustment of one of the members by reason of the yielding teeth may be effected with any suitable adjusting mechanism, and I do not limit my invention to that shown and described. The mechanism shown is designed to cause the drive-shaft to rotate the driven shaft at much-reduced speed. Naturally this construction may be reversed, so that the driving shaft or body may rotate the driven shaft or body at about its own or a greater speed. In neither case is it necessary that the driving and driven members of the speed-gearing shall be adjustable to the point where they are concentric. Obviously the inner member may be the gyratory member, or both may be caused to gyrate in a manner to produce the desired results. Reciprocating plunger-teeth may be substituted for the swinging teeth shown and the yielding teeth employed may be mounted upon the inner instead of the outer member, or both members may have yielding teeth.

The members F and H in all their positions of relative adjustment are maintained in constant rolling contact, thus producing an even or constant transmission of power such as is effected by intermeshing gear-teeth rolling upon each other, as distinguished from the intermittent motions produced by ordinary pawl-and-ratchet constructions. This so-called "rolling" contact and consequent steady power-transmission from one member to the other is due in the present construction to the gyratory movement of the member H, which causes the same to yield relatively to the member F, and thereby insure the positive driving engagement of one tooth H' with the ratchet-wheel when another tooth H' is being disengaged from said wheel. Thus there is no material slip or lost motion between the members, but a constant driving engagement substantially the same as that between a pair of intermeshing gears.

What I claim as new, and desire to secure by Letters Patent, is—

1. The combination with driving and driven bodies, of variable-speed gearing interposed between them having positively-engaging members one of which is yieldable relatively to the other to maintain them in rolling contact, and one transversely adjustable with relation to the other to change the relative diameters of their engaging parts.

2. The combination with driving and driven bodies, of variable-speed gearing interposed between them having toothed intermeshing engaging members one of which is yieldable with relation to the other to maintain them in rolling contact, and one transversely adjustable with relation to the other to change the relative diameters of their pitch-circles.

3. The combination with driving and driven bodies, of variable-speed gearing, interposed between them, having positively-engaging members in rolling contact transversely adjustable one with relation to the other to change the relative diameters of their engaging parts, and means for giving gyratory motion to one of said members.

4. The combination with driving and driven bodies, of variable-speed gearing interposed between them having toothed engaging members one of which is yieldable relatively to the other to maintain them in rolling contact, and one transversely adjustable with relation to the other, the teeth of one member being radially yielding under pressure against them of the other member to change the relative diameters of their pitch-circles.

5. The combination with driving and driven bodies, of variable-speed gearing interposed between them having movable positively-engaging members one of which is yieldable relatively to the other to maintain them in rolling contact, the members being operatively connected with said bodies respectively, and one member being transversely adjustable with relation to the other to change the relative diameters of their engaging parts.

6. The combination with driving and driven bodies, of variable-speed gearing interposed between them having a rotary toothed member operatively connected with one of said bodies, a toothed gyratory member operatively connected with the other of said bodies and meshing with said rotary member, the teeth of one of the said members being yielding, and means for adjusting the members transversely one with relation to the other to change the relative diameters of their engaging parts.

7. The combination with driving and driven bodies, of variable-speed gearing interposed between them having positively-engaging members in rolling contact one of which rotates and the other of which is eccentric to the first and gyrates, means for adjusting the gyratory member transversely to vary its eccentricity and thereby change the relative diameters of the engaging parts of the members.

8. The combination with driving and driven bodies, of variable-speed gearing interposed between them having positively-engaging members one of which rotates and the other of which is eccentric to the first and gyrates, means for adjusting the gyratory member transversely to vary its eccentricity and thereby change the relative diameters of the engaging parts of the members, and an adjustable counterbalance for the said gyratory member.

9. In a variable-speed gearing, the combination with driving and driven shafts in alinement with each other, of a member comprising a ratchet-wheel on one shaft, an eccentric internally-toothed gyratory member on the other shaft around and engaging the other member in rolling contact, the teeth of one of the said members being radially yielding, and means for changing the eccentricity of the said gyratory member.

10. In a variable-speed gearing, the combination with driving and driven shafts in alinement with each other, of a casing into which the shafts extend and in which they are journaled near adjacent ends, a cam and crank, carried by one shaft, relatively adjustable with each other, a cam-block pivoted to the crank and adjusted by the said cam, an internally-toothed gyratory member surrounding the cam-block and held by the casing against axial movement, a rotary member in the form of a ratchet-wheel carried by the other shaft within the gyratory member and meshing therewith, substantially as and for the purpose set forth.

11. In a variable-speed gearing, the combination with driving and driven shafts in alinement with each other, of a casing into which the shafts extend and in which they are journaled near adjacent ends, a cam and crank carried by one shaft relatively adjustable with each other, a cam-block pivoted to the crank and adjusted by the said cam, an internally-toothed gyratory member surrounding the cam-block and held by the casing against axial movement, a rotary member in the form of a ratchet-wheel carried by the other shaft within the gyratory member and meshing therewith, and a counterbalance for the gyratory member adjustable therewith, substantially as and for the purpose set forth.

12. In a variable-speed gearing, the combination of a casing, driving and driven shafts extending into the casing in alinement with each other, oppositely-extending cams on the inner end portion of one shaft, a quill on the same shaft carrying a double crank, means for adjusting the quill and shaft to change the positions of the said cams with relation to the said crank, a cam-block on one of said cams pivotally connected with one end portion of the crank, a counterbalance on the other of said cams pivotally connected with the opposite end portion of said crank, an internally-toothed gyratory member loosely surrounding the cam-block, there being guide-recesses in the casing with which the gyratory member engages to hold it against axial movement, and a rotary member comprising a ratchet-wheel on the other of said shafts within and meshing with the gyratory member, the teeth of one of the said members being yielding, all constructed and arranged to operate substantially as and for the purpose set forth.

WILLIAM C. CONANT.

In presence of—
  H. CLAY MOORE,
  HAMAULIN WALKER.